(12) United States Patent
Trojer et al.

(10) Patent No.: US 9,420,358 B2
(45) Date of Patent: Aug. 16, 2016

(54) METHOD AND ARRANGEMENTS FOR PROTECTION IN AN OPTICAL NETWORK

(75) Inventors: Elmar Trojer, Täby (SE); David Hood, Palo Alto, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 271 days.

(21) Appl. No.: 13/261,467

(22) PCT Filed: Apr. 8, 2010

(86) PCT No.: PCT/SE2010/050383
§ 371 (c)(1),
(2), (4) Date: Oct. 4, 2012

(87) PCT Pub. No.: WO2011/126416
PCT Pub. Date: Oct. 13, 2011

(65) Prior Publication Data
US 2013/0089316 A1    Apr. 11, 2013

(51) Int. Cl.
*H04B 10/00* (2013.01)
*H04Q 11/00* (2006.01)

(52) U.S. Cl.
CPC ....... *H04Q 11/0062* (2013.01); *H04Q 11/0067* (2013.01); *H04Q 2011/0081* (2013.01)

(58) Field of Classification Search
CPC .......... H04Q 11/0062; H04Q 11/0067; H04Q 2011/0081; H04Q 2011/0035; H04Q 2011/0015; H04J 3/0682; H04B 10/032; H04B 10/272
See application file for complete search history.

(56) References Cited

U.S. PATENT DOCUMENTS

| 2010/0098407 A1* | 4/2010 | Goswami et al. ............... 398/5 |
| 2010/0098413 A1* | 4/2010 | Li et al. ........................ 398/38 |
| 2010/0166419 A1* | 7/2010 | Elmoalem et al. ............. 398/2 |

FOREIGN PATENT DOCUMENTS

| CN | 1838548 A | 9/2006 |
| WO | WO 2008114110 A1 * | 9/2008 |
| WO | 2009/050459 A1 | 4/2009 |

OTHER PUBLICATIONS

Recreation—Merriam-Webster, [online], retrieved on Feb. 27, 2015. Retrieved from, <URL: http://www.merriam-webster.com/dictionary/recreation>, 1 page.*
Re-create—Merriam-Webster, [online], retrieved on Feb. 27, 2015. Retrieved from, <URL: http://www.merriam-webster.com/dictionary/re-create>, 1 page.*

(Continued)

*Primary Examiner* — Ken N Vanderpuye
*Assistant Examiner* — David Lambert
(74) *Attorney, Agent, or Firm* — Withrow & Terranova, PLLC (57) ABSTRACT

Method and arrangement for protecting optical network systems, the arrangement (20) is based on an optical electrical optical GPON repeater structure. The repeater structure contains two optical modules—a regular ONU transceiver module and a reset-less OLT transceiver module which are working back-to-back. For management purposes, an ONU MAC module comprised in the repeater structure is intercepting the electrical signals from the ONU transceiver. The arrangement comprising the two repeater structures can be used to relay data between two passive optical network (PON) systems thereby opening a way to implement dual homing via the PON domain. Moreover, the arrangement is configured to enabling switch-over of functionality from one PON to the other PON at a communication failure in the former PON.

12 Claims, 6 Drawing Sheets

(56) References Cited

OTHER PUBLICATIONS

Enable—Merriam-Webster, [online], retrieved on Feb. 27, 2015. Retrieved from, <URL: http://www.merriam-webster.com/dictionary/enable>, 1 page.*
International Search Report for PCT/SE2010/050383 mailed Dec. 30, 2010.
Kang, Justin et al., "Restoration of Ethernet Services over a Dual-Homed GPON System—Operator Requirements and Practical Demonstration," Optical Fiber communication/National Fiber Optic Engineers Conference, Feb. 2008, pp. 1-3.
Author Unknown, "Broadband optical access systems based on Passive Optical Networks (PON)," ITU-T Recommendation G.983.1, Jan. 2005, International Telecommunication Union, 124 pages.
Author Unknown, "A Broadband optical access system with increased service capability by wavelength allocation," ITU-T Recommendation G.983.3, Mar. 2001, International Telecommunication Union, 62 pages.
Author Unknown, "Gigabit-capable Passive Optical Networks (GPON): General Characteristics," ITU-T Recommendation G.984.1, Mar. 2008, International Telecommunication Union, 43 pages.
Author Unknown, "Gigabit-capable Passive Optical Networks (GPON): Physical Media Dependent (PMD) layer specification," ITU-T Recommendation G.984.2, Mar. 2003, International Telecommunication Union, 38 pages.
Author Unknown, "Gigabit-capable Passive Optical Networks (G-PON): Transmission convergence layer specification," ITU-T Recommendation G.984.3, Feb. 2004, International Telecommunication Union, 116 pages.
First Office Action for Chinese Patent Application No. 201080066047.8, mailed Jan. 21, 2015, 12 pages.

* cited by examiner

METHOD AND ARRANGEMENTS FOR PROTECTION IN AN OPTICAL NETWORK

This application is a 35 USC 371 national phase filing of International application number PCT/SE2010/050383 filed Apr. 8, 2010, the disclosure of which is incorporated herein by reference in its entirety.

TECHNICAL FIELD

The present invention relates to an arrangement and a method for protecting an optical network system, and in particular dual homing protection for a passive optical network.

BACKGROUND

In recent years, the requirements for data transfer capacity and reliable networks have increased. Standards have been developed in order to increase the speed and the capacity of optical access network systems.

Reliability of communication networks is an increasingly important parameter, accordingly protection schemes have been discussed in connection with passive optical networks (PONs) with the purpose of minimizing the geographical fault coverage due to faults in equipment and/or fiber infrastructure. Examples of the single and dual homing protection schemes are fiber duplex system (type-A scheme), OLT-only duplex system (type-B scheme), full duplex system (type-C scheme) and partial duplex system (type-D scheme).

Figure 1:
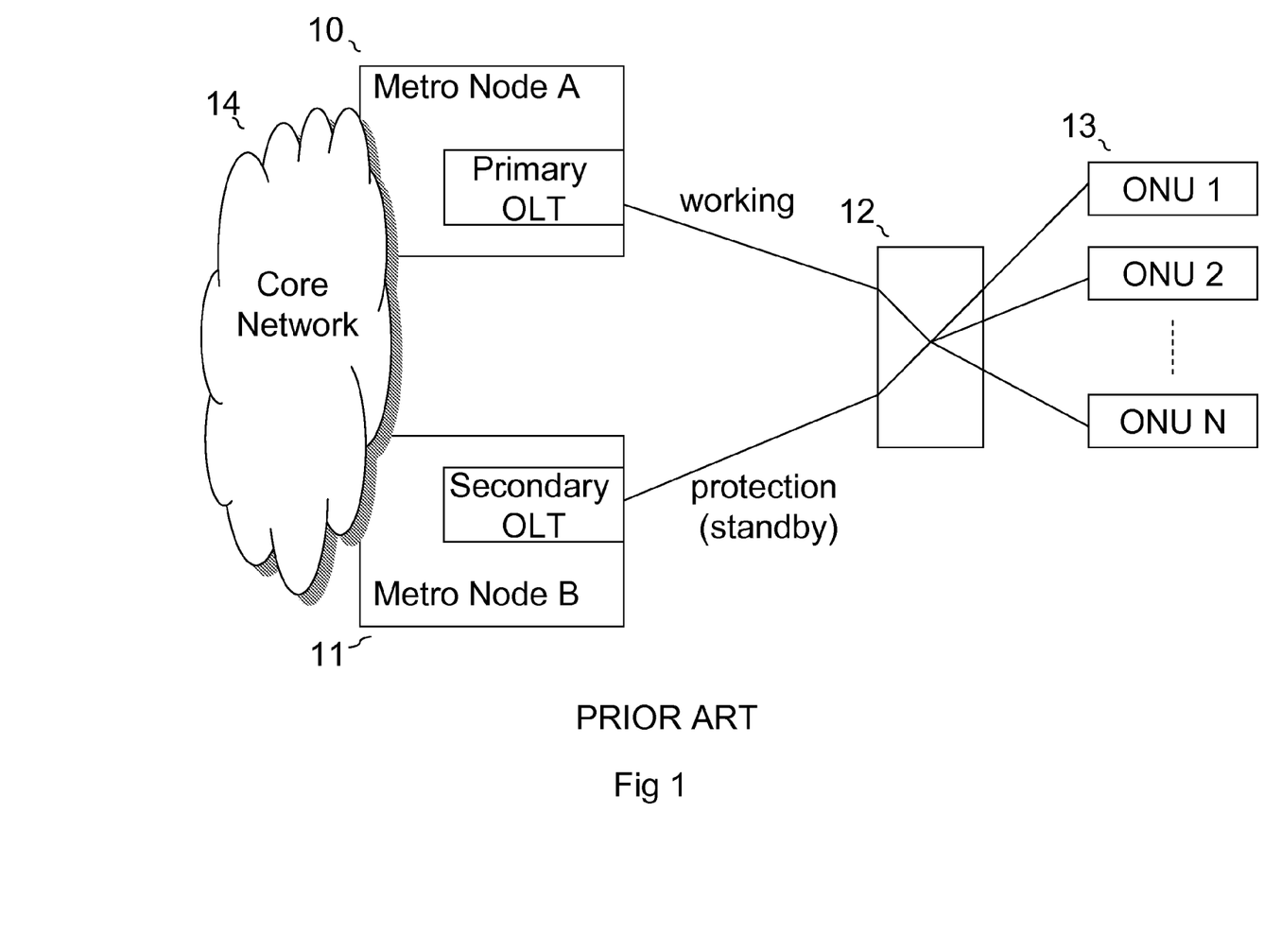
FIG. 1 depicts a prior art dual homing protection scenario, foreseeing two OLTs in geographically different locations hosting users in a type-B protected fashion.

A classical view of dual homing foresees two optical line termination devices (OLTs) in geographically different locations hosting users i.e. the optical network units (ONUs) in a type-B scheme protected fashion. That is, trunk fiber and OLT are duplex, one OLT is in operation and the other OLT is in standby, kicking in if the OLT fails or if the trunk breaks. ONUs and drop fibers are simplex, a typical deployment scenario of which an example is depicted in FIG. 1. In case a primary OLT 10 fails, a secondary OLT 11 in cold-standby takes over and puts the users 13, connected via a splitter 12, back in service. Classical dual homing use a core network 14 for traffic since the secondary OLT 11 is on cold standby. Moreover, the OLTs need to exchange user configuration data via the core network to establish service in case of a failure. Thus, it's a high cost solution.

SUMMARY

It is therefore an object of the present invention to address some of the problems and disadvantages outlined above and to provide a method and an arrangement for dual homing protecting of optical networks which are cost effective.

The above stated object is achieved by means of a method and an arrangement according to the independent claims, and by the embodiments according to the dependent claims.

In accordance with a first aspect of the present invention an arrangement for protecting a first and a second optical network system is provided. The optical network systems comprises a first and a second optical line termination device (OLT) respectively. The arrangement comprises a first and a second OLT transceiver module adapted to be connected to the first and the second optical network system, respectively. The OLT transceiver modules are further connected to a first and a second optical network unit media access controller (ONU MAC) module, respectively. The arrangement also includes a first and a second ONU transceiver module adapted to be connected to the first and the second OLT, respectively. Moreover, the ONU transceiver modules are connected to the first and the second ONU MAC module, respectively. The first OLT transceiver module is connected to the second ONU transceiver module and the second ONU MAC module and the second OLT transceiver module is connected to the first ONU transceiver module and the first ONU MAC module. Additionally, the ONU MAC module is connected to the second ONU MAC module. Furthermore, the arrangement provides bidirectional paths of communication between the first OLT and the second OLT, wherein the bidirectional paths of communication are arranged to relay data between the optical network systems. The arrangement is configured to switching over functionality from the first OLT to the second OLT at a communication failure in the first OLT.

In accordance with a second aspect of the present invention a method for protecting a first and a second optical network system is provided. The optical network systems comprises a first and a second optical line termination device (OLT) respectively. Furthermore, the optical network systems comprise a dual-homing optical network unit (DHONU) arrangement. The DHONU arrangement comprises a first and a second OLT transceiver module adapted to be connected to the first and the second optical network system, respectively. The OLT transceiver modules are further connected to a first and a second optical network unit media access controller (ONU MAC) module, respectively. The arrangement also includes a first and a second ONU transceiver module adapted to be connected to the first and the second OLT, respectively. Moreover, the ONU transceiver modules are connected to the first and the second ONU MAC module, respectively. The first OLT transceiver module is connected to the second ONU transceiver module and the second ONU MAC module and the second OLT transceiver module is connected to the first ONU transceiver module and the first ONU MAC module. Additionally, the ONU MAC module is connected to the second ONU MAC module. Furthermore, the arrangement provides bidirectional paths of communication between the first OLT and the second OLT. The method comprises the steps of detecting communication failure in the first OLT and switching over functionality from the first OLT to the second OLT.

An advantage of embodiments of the present invention is that they provide a dual homing protection scheme where both a first and a second OLT can run user traffic during normal operation, providing a low cost dual homing protection solution.

Another advantage of embodiments of the present invention is that they provide a synchronized control path between a first and a second OLT for control data exchange and synchronization exchange i.e. there is no need to exchange data via the core network.

A further advantage of embodiments of the present invention is that due to the synchronicity of the PON transport, fast switch-over times can be achieved.

Yet another advantage of embodiments of the present invention is that they provide a cost effective dual MAC-ONU DHONU arrangement, which is based on existing OEO GPON repeaters consisting of a standard ONU medium access control chip component and regular PON optics working back-to-back.

Yet another advantage of embodiments of the present invention is that they provide a protection scheme which can be chained up to give perfect circular protection area coverage.

Further advantages and features of embodiments of the present invention will become apparent when reading the following detailed description in conjunction with the drawings.

BRIEF DESCRIPTION OF THE DRAWINGS

For a better understanding, reference is made to the following drawings and preferred embodiments of the invention.

DETAILED DESCRIPTION

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practised in other embodiments that depart from these specific details. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The basic concept of the present invention it to provide an arrangement for protecting two or more optical network systems which could be based on an optical electrical optical giga-bit passive optical network (OEO GPON) repeater structure. The repeater structure contains two optical modules—a regular ONU transceiver module and a reset-less OLT transceiver module which are working back-to-back. For management purposes, an ONU MAC module comprised in the repeater structure is intercepting the electrical signals from the ONU transceiver. The arrangement comprising two such repeater structures can be used to relay data between two PON trees thereby opening a way to implement dual homing via the PON domain. Moreover, the arrangement is configured to enabling switch-over of functionality from one optical network system to the other optical network system at a communication failure in the former optical network system.

The arrangement of the present invention is referred to as the dual homing ONU (DHONU) arrangement in the following description.

Figure 2:
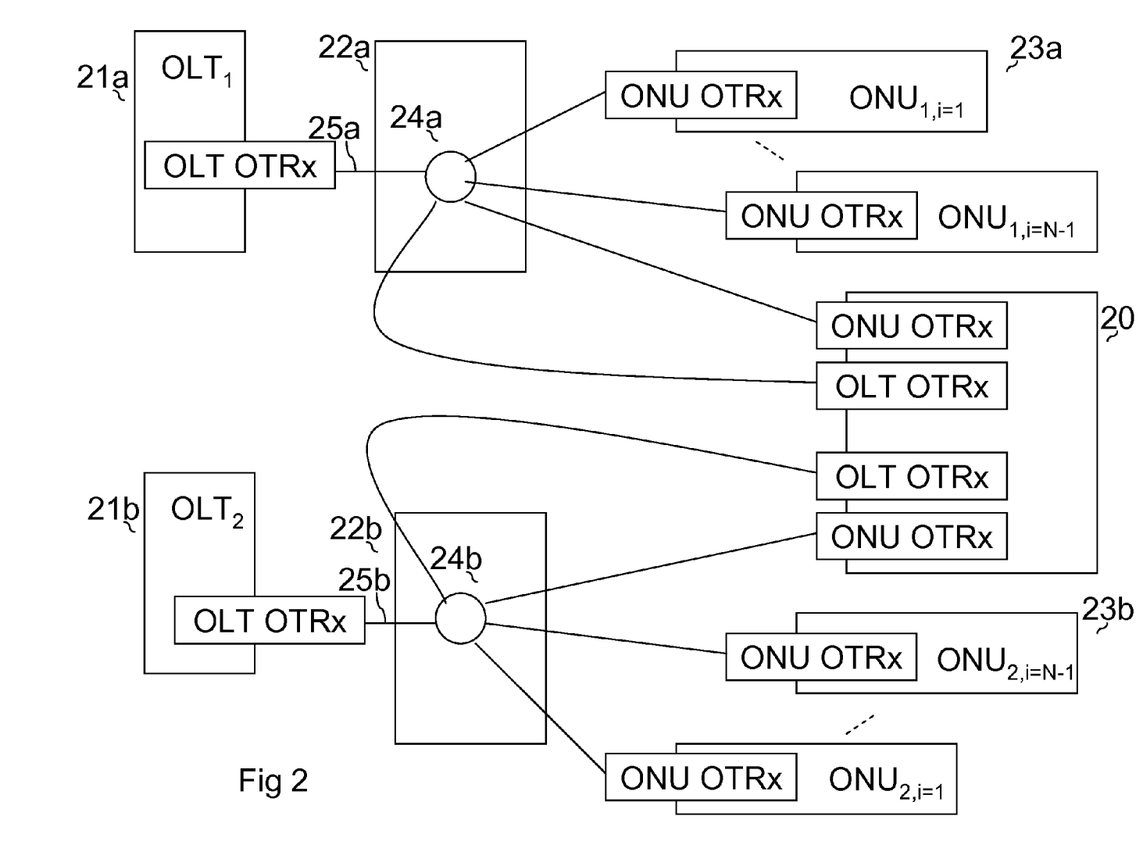
FIG. 2 depicts schematically a dual homing protection scenario, wherein embodiments of the present invention may be implemented.

FIG. 2 depicts schematically a dual homing protection scenario, wherein embodiments of the present invention may be implemented. A first passive optical network $PON_1$ comprises at least one optical network unit ($ONT_{1,1}$) 23a, an optical distribution network ($ODN_1$) 22a comprising a splitter 24a and an optical line termination device ($OLT_1$) 21a.

The optical network unit $ONU_{1,1}$ 23a communicates with the optical line terminal $OLT_1$ 21a on a connection via the optical distribution network 22a and an optical fiber trunk 25a connected to the optical line termination device $OLT_1$ 21a. In the equivalent manner, a second passive optical network $PON_2$ comprises at least one optical network unit ($ONU_{2,1}$) 23b, an optical distribution network ($ODN_2$) 22b comprising a splitter 24b and an optical line termination device ($OLT_2$) 21b. The optical network unit $ONU_{2,1}$ 23b communicates with the optical line termination device $OLT_2$ 21b on a connection via the optical distribution network 22b and an optical fiber trunk 25b connected to the optical line termination device $OLT_2$ 21b.

The optical line termination device, such as $OLT_1$ 21a and $OLT_2$ 21b, hosts or is connected to a number N of optical network units ($ONU_{1,1-1}$, $ONU_{1,2}$, ..., $ONU_{1,1-N}$). Typically, $N=2^p$, where p equals 0, 1, 2, 3, 4, 5, 6, 7, 8, 9, 10 corresponding to N equal to 1, 2, 4, 8, 16, 32, 64, 128, 256, 512, 1024. A higher number of optical network units may be contemplated.

The splitter 24a included in the first PON comprises N ONU drop ports towards the N ONU transceiver modules and a trunk port connected to the optical line termination OLT transceiver module of the $OLT_1$. In a corresponding manner, the splitter 24b included in the second PON comprises N ONU drop ports towards the N ONU transceiver modules and a trunk port connected to the optical line termination OLT transceiver module of the $OLT_2$.

During normal operation $OLT_x$ is communicating with $ONU_{x,1}$ to $ONU_{x,N-1}$ and also the DHONU arrangement acting as a regular $ONU_{x,N}$ in the particular ODN. Both OLTs are in service and all users per PON are served i.e. no cold standby. OLT transmitter modules in the DHONU arrangement are deactivated i.e. lasers are off but the receiver is listening to detect a fault. In this situation, there is a bidirectional path of communication between $OLT_1$ and $OLT_2$ which can be used for DHONU arrangement management, periodic configuration data exchange, and DHONU arrangement health status info. If either $OLT_1$ or $OLT_2$ placed in different geographical locations fails or one of their trunk fibers break, the DHONU arrangement can detect the fault and switch over the users from the broken PON to the working PON acting as a long-reach repeater.

Figure 3:
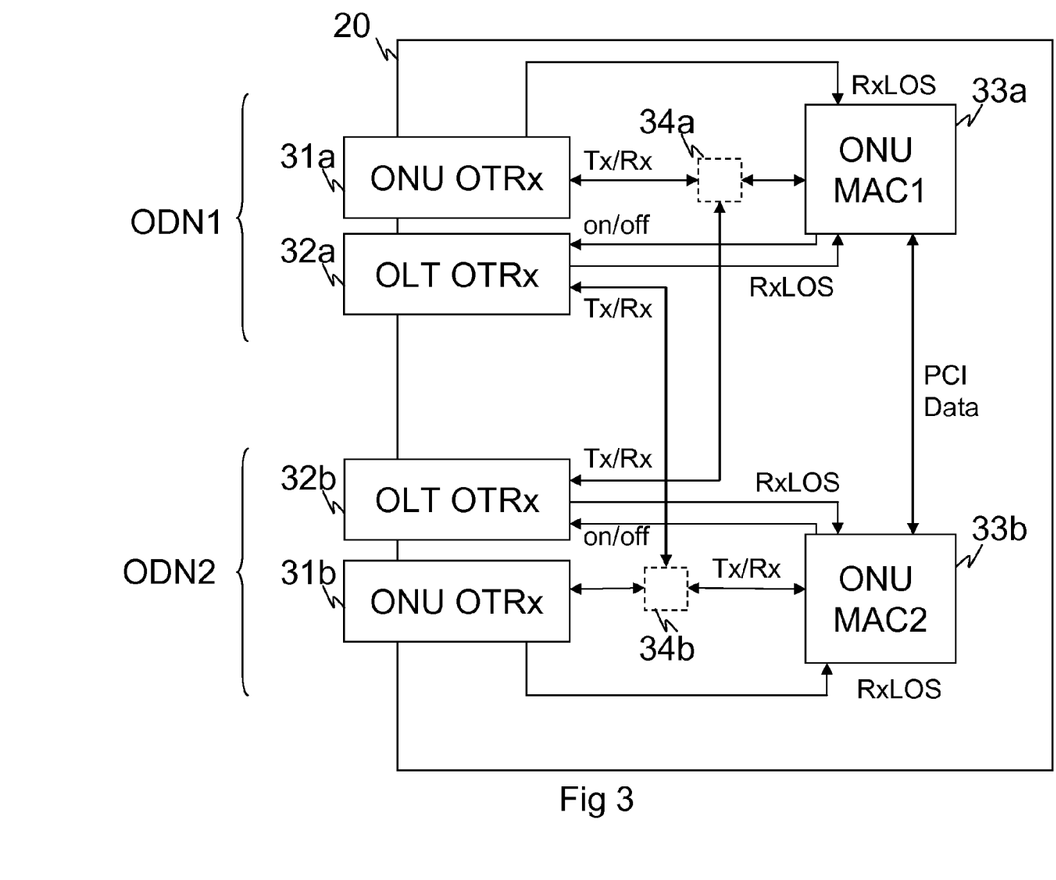
FIG. 3 is a schematic block diagram illustrating a DHONU arrangement according to embodiments of the present invention.

FIG. 3 illustrates a DHONU arrangement, according to an embodiment of the present invention, relaying data between two PON trees and thereby opening a way to implement dual homing via the PON domain.

The DHONU arrangement 20 comprises a first OLT transceiver module 32a which is connected to a first optical network unit media access controller (ONU MAC) module 33a. The arrangement comprises a first ONU transceiver module 31a which is also connected to the first ONU MAC module 33a. Furthermore, the arrangement comprises a second OLT transceiver module 32b which is connected to a second optical network unit media access controller (ONU MAC) module 33b. The DHONU arrangement also comprises a second ONU transceiver module 31b which is also connected to the second ONU MAC module 33b. Moreover, the first OLT transceiver module 32a is connected to the second ONU transceiver module 31b and the second ONU MAC module 33b. Likewise, the second OLT transceiver module 32b is connected to the first ONU transceiver module 31a and the first ONU MAC module 33a. Additionally, the first ONU MAC module 33a is connected to the second ONU MAC module 33b. In one embodiment of the present invention the DHONU arrangement 20 comprises at least one burst-mode signal combiner and/or a buffer 34a, 34b. When a buffer is included in the DHONU arrangement 20 it takes the input signal from the ONU transmitter module and copies it to the two output ports of the buffer. Both modules connected to the buffer receive the copied data. However, when the ONU MAC module transmits signals the signals need to be burst-mode combined. The burst-mode signal combiner takes the signals on the two input ports and adds them together, sending them on the output port. In the embodiment of the present invention wherein the DHONU arrangement does not include a signal combiner, upstream signals can be optically combined by adding another ONU transceiver connecting to the ONU MAC module. However, if the signals are combined electrically, the additional ONU module can be spared.

Moreover, the first OLT transceiver module $32a$ is adapted to be connected to the first optical network system and the second OLT transceiver module $32b$ is adapted to be connected to the second optical network system. The first ONU transceiver module $31a$ and the second ONU transceiver module $31b$ are adapted to be connected to the first and the second optical network system, respectively.

Thus, the DHONU arrangement is configured to be connected between the two optical network systems, providing bidirectional paths of communication between the first OLT and the second OLT, wherein the bidirectional paths of communication are arranged to relay data between the optical network systems.

In one embodiment of the present invention of the DHONU arrangement, when a communication failure in one of the OLTs occurs, the bidirectional paths of communication are arranged to relay data necessary for service recreation after switch-over between the optical network systems. However, when both the OLTs are up and running the relayed data could be system state information, user configuration information and/or alarms.

An OEO GPON repeater structure that allows extending the reach of a PON to 60 km by 3R operation, i.e. re-amplification, reshaping, and retiming of the signals traversing in both direction on the trunk line of the optical PON tree have been outlined in ITU (International Telecommunication Union). The OEO GPON repeater includes an ONU transceiver module and an OLT transceiver module and an ONU MAC module. The DHONU arrangement may comprise two OEO GPON repeaters. That is, first OEO GPON repeater comprises the first ONU transceiver module $31a$ and the second OLT transceiver module $32b$ and the first ONU MAC module $33a$. Likewise, the second OEO GPON repeater comprises the second ONU transceiver module $31b$ and the first OLT transceiver module $32a$ and the second ONU MAC module $33b$.

It should also be mentioned that the DHONU arrangement 20 could be adapted to be connected to the first and the second optical network system via splitters $24a$, $24b$ As shown in FIG. 2, the first ONU transceiver module $31a$ and the first OLT transceiver module $32a$ in the DHONU arrangement 20 is connected to the splitter $24a$ of the first PON. The second ONU transceiver module $31b$ and the second OLT transceiver module $32b$ in the DHONU arrangement 20 are connected to the splitter $24b$ of the second PON. Moreover, the ONU transceiver modules $31a$, $31b$ connect to the output of the corresponding splitters $24a$, $24b$ whereas the OLT transceivers $32a$, $32b$ connect to the input of the splitters $24a$, $24b$. The splitters $24a$, $24b$ are conventional 2:N splitters utilized in PONs.

In regular operation of the first passive optical network $PON_1$, $OLT_1$ is active and serves the optical network units $ONU_{1,i}=1$, $ONU_{1,2}, \ldots, ONU_{1,N-1}$ and also the DHONU arrangement, acting as a regular optical network unit $ONU_{1,N}$. Likewise, the second passive optical network $PON_2$, $OLT_2$ is active and serves the optical network units $ONU_{2,i}=1$, $ONU_{2,2}, \ldots, ONU_{2,N-1}$ and also the DHONU arrangement, acting as a regular optical network unit $ONU_{2,N}$. Hence, both $OLT_1$ and $OLT_2$ are in service and all users per PON are served (i.e. no cold standby). The OLT transmitter in the DHONU arrangements are deactivated (i.e. lasers are off) but the receivers are listening (energy detect signal from module) on data from corresponding ONUs to detect a fault. The DHONU arrangement 20 provides a bidirectional path of communication between $OLT_1$ and $OLT_2$ which can be used for DHONU management, periodic configuration data exchange, or DHONU health status information. The DHONU arrangement 20 is configured to switching over functionality from $OLT_1$ $21a$ to $OLT_2$ $21b$ at a communication failure in $OLT_1$ $21a$. Thus, the relayed data transmitted on the bidirectional path of communication between $OLT_1$ and $OLT_2$ may include system state information, user configuration information and/or alarms. The relayed data is required for service recreation after a performed switch-over.

In one embodiment of the present invention the ONU transceiver module and ONU MAC module in the DHONU arrangement communicating with the OLT need to detect a fault in the communication in addition to the condition that the OLT transceiver module detecting a fault in order to trigger switch-over.

There are several ways to configure the capacity of $PON_1$ and $PON_2$. Among them one basic way to configure the PONs is to set up $OLT_1$ as a working optical line termination device and $OLT_2$ in warm standby, kicking in if the $OLT_1$ fails or if the trunk breaks. In this solution $OLT_2$, beside for the traffic transmitted in the DHONU, does not carry any traffic and is exclusively configured to restore the full service state of $OLT_1$ when a failure occurs.

Another basic way to configure the PONs is to set up both $OLT_1$ and $OLT_2$ as hosting ONUs running traffic. During switch-over some services from $OLT_1$ and/or $OLT_2$ could be torn down not to overload the PON when an OLT dies. A possible scenario would be to reserve some bandwidth on $OLT_1$ and $OLT_2$, e.g. 20% of the bandwidth, to have enough capacity to preserve important services during a failure. In case only 50% of the capacity is used on both PONs, no services would be lost in case of a failure of the $OLT_1$ or $OLT_2$ or if a trunk breaks. It should also be pointed out that it is possible to reserve different amount of bandwidth of the OLTs. For example, 20% of the bandwidth could be reserved on $OLT_1$ and 30% of the bandwidth could be reserved on $OLT_2$.

On high level, the following functional steps are necessary for fast inter-pack switch-over based on partial re-ranging. $OLT_1$ and $OLT_2$ are in the same facility protection group with $OLT_2$ in warm standby and $OLT_1$ the primary port.

Figure 4:
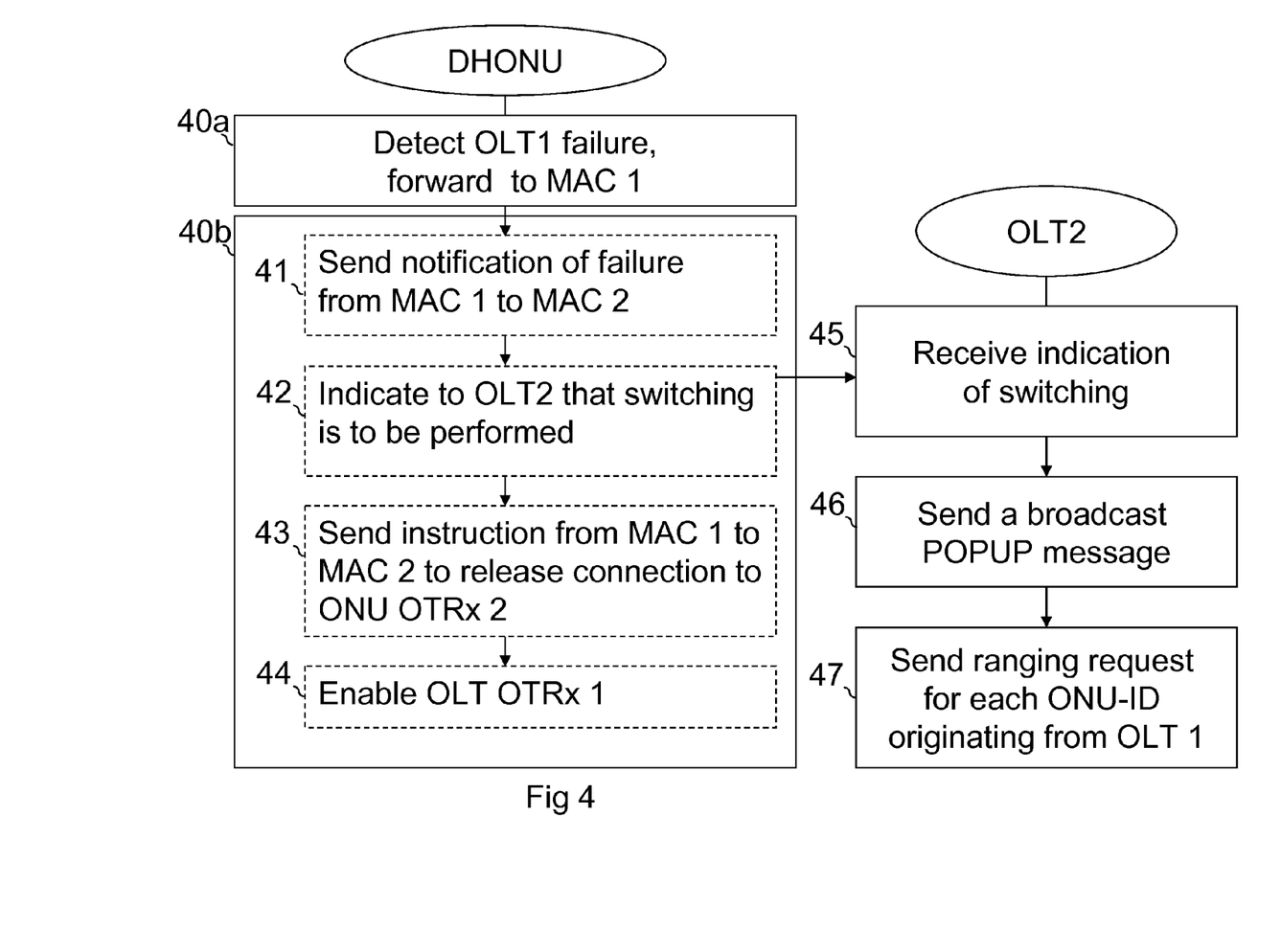
FIG. 4 is a flowchart of the methods according to embodiments of the present invention performed in the DHONU arrangement and the OLT.

If either $OLT_1$ $21a$ or $OLT_2$ $21b$ placed in different geographical locations fails or one of their trunk fibers $25a$, $25b$ breaks, the DHONU arrangement 20 can detect the fault and connect the users from the broken PON to the working PON acting as a long-reach repeater. FIG. 4 contains a flow chart illustrating a method for protecting a first and a second optical network system, according to a first exemplary embodiment of the present invention. In the following description, without loosing generality due to the symmetric architecture, it is assumed that $OLT_1$ $21a$ comprised in $PON_1$ fails and that $OLT_2$ $21b$ comprised in $PON_2$ is still working. Obviously, it could be assumed that $OLT_2$ $21b$ comprised in $PON_2$ fails and that $OLT_1$ $21a$ comprised in $PON_1$ is still working. Apparently, due to the symmetric architecture, the principles described in the following description would be applicable in such a scenario.

In step 40a the first OLT transceiver module 32a listening to $ONU_{1,i}=1$, $ONU_{1,2}$, ..., $ONU_{1,N}$ detects communication failure of the $OLT_1$ 21a, e.g. the OLT transceiver module detects loss of signal (LOS), and forwards the detection to the first ONU MAC module 33a. A LOS indicates that all $ONU_{1,i}$ on $PON_1$ lost communication to $OLT_1$ and entered POPUP state. In addition the DHONU part connecting to $OLT_1$ 21a which is acting as regular $ONU_{1,N}$ also detects a fault by loss of the bidirectional OLT-to-OLT communication channel. This fault is not sufficient to detect a communication failure of the $OLT_1$ 21a since also the drop fiber to the DHONU part acting as regular $ONU_{1,N}$ could have failed. In one embodiment of the present invention, both the OLT transceiver module and the ONU transceiver module need to detect a communication fault to be sure of a fault on OLT and ODN.

However, the OLT transceiver module could detect any of loss of signal, loss of framing or a signal degradation indicator from the ONUs. In FIG. 2 it is shown that the OLT transceiver module 32a sends a LOS to the ONU MAC module 33a.

Next, in a step 40b, functionality from $OLT_1$ 21a to $OLT_2$ 21b is switched over. In one embodiment of the present invention, this step is performed in a number of sub steps. In a step 41, the first ONU MAC module 33a informs the second ONU MAC module 33b of the communication failure by sending a notification of failure. Thereupon the second ONU MAC module 33b indicates, in a step 42, to the second $OLT_2$ 21b that switching of functionality from the $OLT_1$ to the $OLT_2$ is to be performed. This could be performed by sending a message on the physical layer of operation and maintenance (PLOAM) channel that a switch-over has to be initiated by the $OLT_2$. Next, in a step 43, the first ONU MAC module 33a informs the second ONU MAC module 33b that is should release the connection to the ONU transceiver module with the still working $PON_2$. This step is necessary in order to prevent interference with data coming from the OLT transceiver module 32a in the signal combiner 34b. The first ONU MAC module 33a then enables, in a step 44, the whole OLT transceiver module 32a. (In FIG. 2 it is shown that the ONU MAC module 33a sends an ON signal to the OLT transceiver module.) This action puts the DHONU arrangement in repeater mode, bridging between OLT transceiver module 32a and ONU transceiver module 31b.

Furthermore, the $OLT_2$ receives the indication, in a step 45, that switching of functionality from the $OLT_1$ to the $OLT_2$ is to be performed. Thereupon, the $OLT_2$ sends a broadcast POPUP message within a certain timer expiration i.e. the TO2 timer, in a step 46. Next, in a step 47, the $OLT_2$ sends a ranging request for some or all of the ONUs in $PON_1$ to gain timing information. If a POPUP message from the $OLT_2$ is received within TO2, the ONUs can be brought back to service without a lengthy initialization procedure. That is, that the $ONU_{1,i}$, $ONU_{1,2}$, ..., $ONU_{1,N}$ can be ranged in very quickly enables fast recovery times.

In this state, $OLT_2$ host its original $ONT_{2,1}$ $ONU_{2,1}$, $ONU_{2,2}$, ..., $ONU_{2,N-1}$ and gets extended by $ONU_{1,1}$, $ONU_{1,2}$, ..., $ONU_{1,N-1}$ and also by the ONU transceiver module 31a of the DHONU i.e. $ONU_{1,N}$ via the repeater.

In one embodiment of the present invention, all ONUs hosted by $OLT_1$ are switched over to $OLT_2$, i.e. all functionality of $OLT_1$ is switched over. However, in another embodiment only a part of the ONUs are switched over, i.e. a part of the functionality of $OLT_1$ is switched-over to $OLT_2$.

In case of a switch-over, bringing ONUs quickly back in service is required. For example, a 50 ms SONET (Synchronous Optical Networking) switching time have been discussed as a maximum switching time for an enterprise PON.

In order to achieve this fast switch-over, the described fast-ranging method could be implemented. When fast-ranging the 64 ONUs illustrated in FIG. 2 in accordance with the described method of the present invention, a maximum delay of approximately 35 ms might occur. The table below shows the switching time components and their delays, respectively.

| Message | Time | Interface |
| --- | --- | --- |
| OLT-2 trigger | 10 ms (assumed) | Control interface between packs |
| ONU frame PSYNC align | 0.25 ms | G.984.3 M1 = 2 |
| ONU broadcast POPUP | 0.75 ms | 3 trials if erroneous |
| OLT ranging request per ONU-id | 8 ms | N times (value for N = 64), no retransmission |
| ONU serial number OU msg | 8 ms | N times 125 us, no retransmission |
| OLT ranging time msg | 8 ms | N times 125 us, no retransmission |
| Total time: | 35 ms | |

It should be noted that any failing ranging attempt will increase the total time by some milliseconds.

Moreover, it should be noted that the DHONU arrangement is reachable via the first ONU MAC module 33a since the second ONU MAC module 33b is out of service, i.e. the DHONU arrangement is connected to $OLT_2$ 21b via $ODN_1$ 22a and $ODN_2$ 22b.

However, if a burst-mode (BM) combiner is not comprised in the DHONU arrangement, there is no connection to the DHONU arrangement during switch-over. When the DHONU arrangement via the second ONU MAC module 33b is ranged to $OLT_2$, it gets reachable and can be used to switch back if the fault has been resolved. However, if a BM combiner is comprised in the DHONU arrangement, the second ONU MAC module 33b may stay active during switch-over and the DHONU arrangement is reachable even during switch-over.

Additionally, it should be noted that when there is a problem in drop to ONU transceiver module 31a of the DHONU arrangement i.e. $ONU_{1,N}$, a LOS will be detected by ONU transceiver module 31a. The module transmits the LOS to the first ONU MAC module 33a. However, $PON_1$ is still working and no switching over of functionality is necessary. The DHONU arrangement 20 is still reachable via $OLT_2$ and an alarm on $OLT_2$ may be raised via the second ONU MAC module 33b. The first ONU MAC module 33a informs the second ONU MAC module 33b via the data bus of the LOS. Since drop lines are critical during switch-over, the problem need to be fixed immediately.

A minimum differential reach of 20 km i.e. the distance between a splitter and an optical network unit should be a maximum of 20 km has been discussed in standardization. In practice longer differential reaches are not desirable since the repetitive quiet window grows which reduces PON efficiency. Under the assumption of a 20 km differential reach and a 250 μs quiet window, the following trade-off occurs in the exemplary protection scheme described previously.

Figure 5:
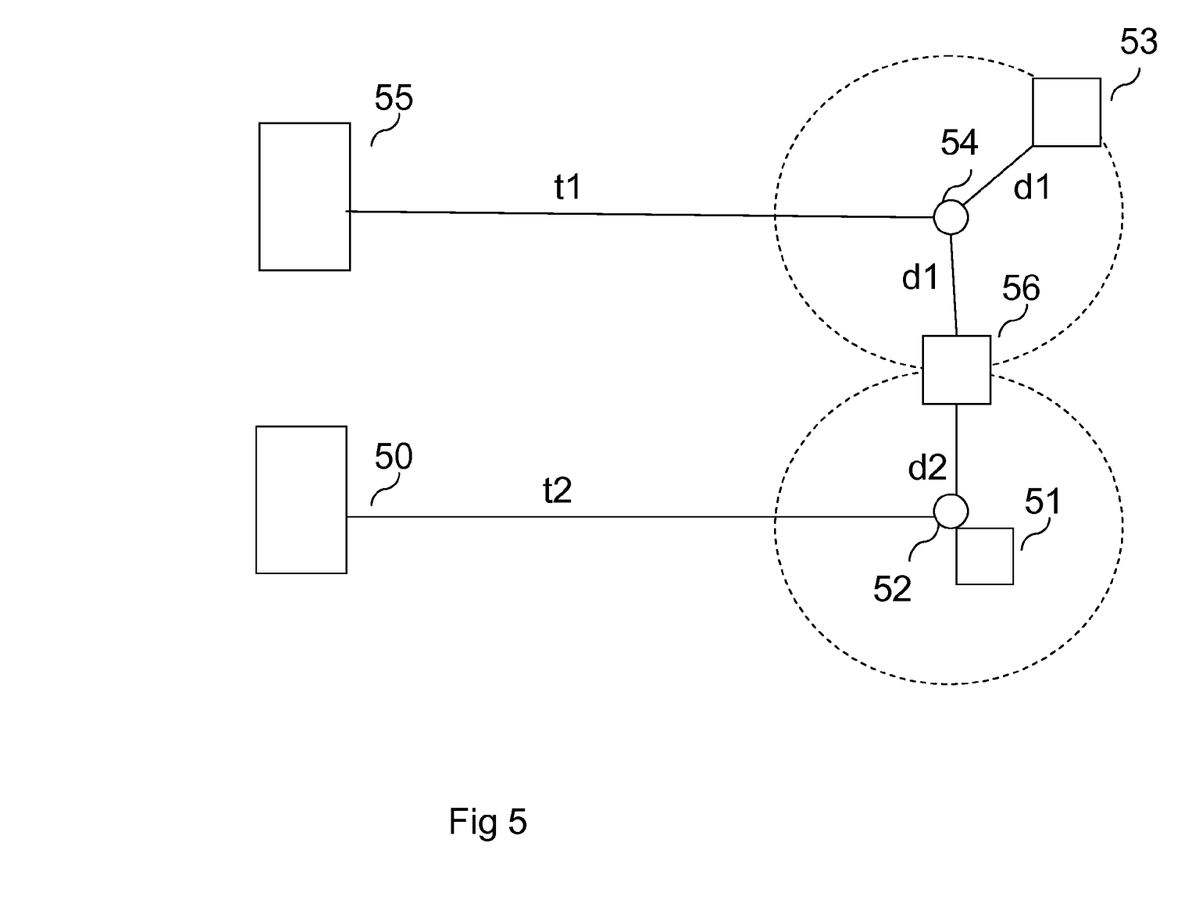
FIG. 5 depicts schematically a differential reach scenario.

In FIG. 5 a differential reach scenario is depicted. From the perspective of $OLT_2$ 50, the geographically closest optical network unit is denoted 51 in this scenario. The ONU 51 is located close to the splitter 52 of the passive optical network in which $OLT_2$ is comprised at a distance t2 from the $OLT_2$. The geographically most far out optical network unit is denoted 53 and located at a distance d1 to the splitter 54 of the passive optical network in which $OLT_1$ 55 is comprised. A DHONU arrangement 56 is located between the splitters 52, 54 at a distance d1 from the splitter 54 of passive optical network in which $OLT_1$ 55 is comprised and at a distance d2 from the splitter 52 of passive optical network in which $OLT_2$ 50 is comprised. The total distance between the $OLT_2$ 50 and the most far out optical network unit 53 via the repeater of the DHONU arrangement 56 is t2+d2+2d1. Keeping a maximal differential distance of 20 km gives that:

$$d2+2d1<L$$

where L is the maximum differential reach.

In an equivalent manner, from the perspective of $OLT_1$ 55, keeping a maximal differential distance of 20 km gives that:

$$d2+2d1<L$$

Analysis of these two inequalities gives an operation region for the DHONU arrangement placement 56 between the two splitters 52, 54.

When d1 equals d2, the point L/3 on the axis is a maximum distance from the DHONU arrangement to the splitter i.e. the maximum drop circle radii is about 6.6 km for L=20 km. That is, the maximum allowable distance between the two splitters is 2 L/3 i.e. 13.3 km for L=20 km, providing an operational region 60 illustrated in FIG. 6.

Figure 6:
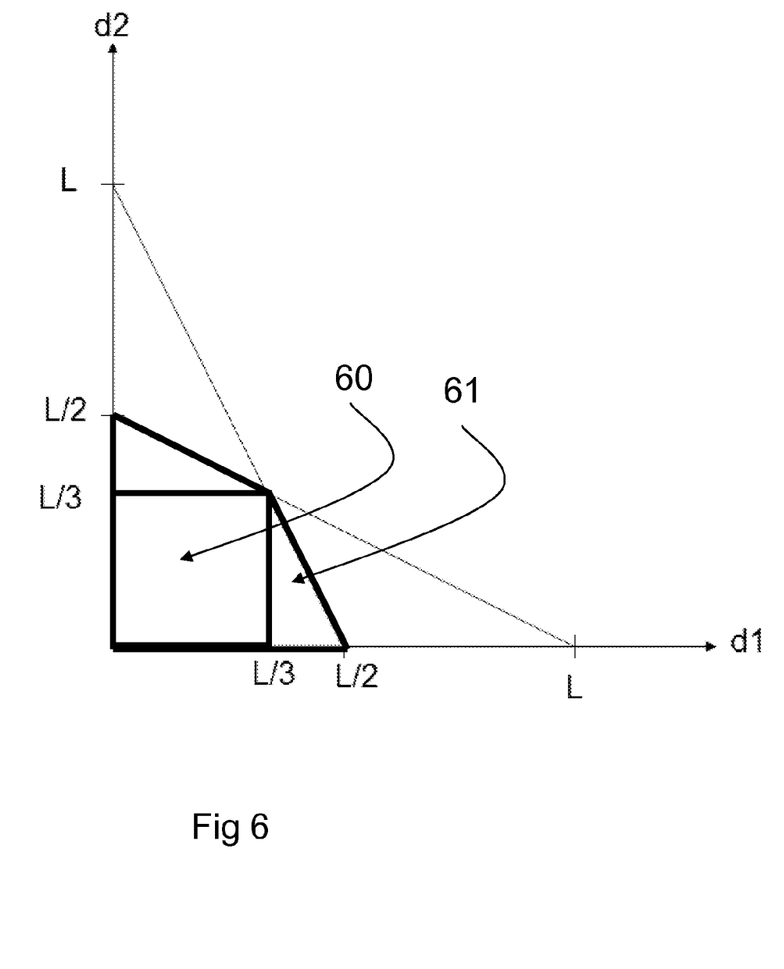
FIG. 6 illustrates the deployment area of the DHONU arrangement of the present invention.

For d1 larger than L/3 but smaller than L/2, d2 needs to be less than L/3, providing a operational region 61 also illustrated in FIG. 6. When both d1 and d2 is less than L/3, d1 and d2 can be chosen freely.

It should be noted that extending the differential reach to L=60 km is under discussion in standardization.

It should also be noted that the invention and its exemplary embodiments may be applied in all kinds of PONs e.g. BPON, GPON, XGPON, EPON and 10GEPON.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A dual-homing optical network unit, DHONU, arrangement comprising:
   a first and a second optical line termination device, OLT, transceiver module;
   a first and a second optical network unit media access controller, ONU MAC, module, wherein the first and second OLT transceiver modules are connected to the first and second ONU MAC modules, respectively,
   a first and a second optical network unit, ONU, transceiver module, wherein the first and second ONU transceiver modules are connected to the first and the second ONU MAC modules, respectively,
   the first OLT transceiver module is connected to the second ONU transceiver module and the second ONU MAC module;
   the second OLT transceiver module is connected to the first ONU transceiver module and the first ONU MAC module; and
   the first ONU MAC module is connected to the second ONU MAC module;
   wherein the first and second OLT transceiver modules of the DHONU arrangement are adapted to be connected to a first optical network system comprising a first OLT and a second optical network system comprising a second OLT, respectively, the first OLT serving a first set of optical network units, ONUs, including the DHONU arrangement and the second OLT serving a second set of ONUs including the DHONU arrangement, the first and second ONU transceiver modules of the DHONU arrangement adapted to be connected to the first and the second OLT, respectively;
   the DHONU arrangement providing bidirectional paths of communication between the first OLT and the second OLT, wherein the bidirectional paths of communication are arranged to relay data between the first optical network system and the second optical network system via the DHONU arrangement; and
   the DHONU arrangement is configured to switch over functionality from the first OLT to the second OLT as a result of a communication failure in the first OLT such that the second OLT serves the first set of ONUs via the DHONU arrangement.

2. The arrangement according to claim 1, wherein the relayed data is at least one of system state information, user configuration information and alarms.

3. The arrangement according to claim 1, wherein at the communication failure in the first OLT, the relayed data is data required for re-creating service after switch-over.

4. The arrangement according to claim 1, wherein the first ONU transceiver module and the second OLT transceiver module and the first ONU MAC module are comprised in an optical electrical optical giga-bit passive optical network repeater.

5. The arrangement according to claim 1, comprising at least one signal combiner.

6. The arrangement according to claim 1, wherein the arrangement is adapted to be connected to the first and the second optical network system via splitters.

7. A method of operation of a dual-homing optical network unit, DHONU, arrangement, the DHONU arrangement comprising:
   a first and a second first optical line termination device, OLT, transceiver module;
   a first and a second optical network unit media access controller, ONU MAC, module, wherein the first and second OLT transceiver modules are connected to the first and second ONU MAC modules, respectively,
   a first and a second optical network unit, ONU, transceiver module, wherein the first and second ONU transceiver modules are connected to the first and the second ONU MAC module, respectively,
   the first OLT transceiver module is connected to the second ONU transceiver module and the second ONU MAC module;
   the second OLT transceiver module is connected to the first ONU transceiver module and the first ONU MAC module; and
   the first ONU MAC module is connected to the second ONU MAC module;
   wherein the first and second OLT transceiver modules of the DHONU arrangement are adapted to be connected to a first optical network system comprising a first OLT and a second optical network system comprising a second OLT, respectively, the first OLT serving a first set of optical network units, ONUs, including the DHONU arrangement and the second OLT serving a second set of ONUs including the DHONU arrangement, the first and second ONU transceiver modules of the DHONU arrangement adapted to be connected to the first and the second OLT, respectively;
   the DHONU arrangement providing bidirectional paths of communication between the first OLT and the second OLT via the DHONU arrangement, the method the steps of:

detecting communication failure in the first OLT, switching over functionality from the first OLT to the second OLT such that the second OLT serves the first set of ONUs via the DHONU arrangement.

8. The method according to claim 7, wherein all functionality of the first OLT is switched over to the second OLT.

9. The method according to claim 7, wherein the step of detecting the communication failure in the first OLT comprises the first OLT transceiver module detecting the communication failure of the first OLT, forwarding the detection to the first ONU MAC module, and the step of switching over functionality comprises the steps of:

the first ONU MAC module informing the second ONU MAC module of the communication failure;

the second ONU MAC module indicating to the second OLT switching of functionality from the first OLT to the second OLT;

the first ONU MAC module informing the second ONU MAC module to release connection to the second ONU transceiver module; and the first ONU MAC module activating the first OLT transceiver module.

10. The method according to claim 9, wherein the step of detecting communication failure in the first OLT comprises the first ONU transceiver module detecting communication failure of the first OLT, and forwarding the detection to the first ONU MAC module.

11. The method according to claim 9, wherein the step of the first OLT transceiver module detecting the failure of the first OLT comprises receiving a loss of signal or loss of framing or a signal degradation indicator from the first OLT.

12. The method according to claim 8, wherein the second ONU MAC indicates switching of functionality from the first OLT to the second OLT via a physical layer operations, administration and maintenance channel.

* * * * *